United States Patent
Zhang

(10) Patent No.: US 9,975,474 B2
(45) Date of Patent: May 22, 2018

(54) RIDING HELMET WITH AUTOMATIC BRAKE DETECTION AND STEERING INDICATION FUNCTIONS

(71) Applicant: Ming Zhang, Fo Shan (CN)

(72) Inventor: Ming Zhang, Fo Shan (CN)

( * ) Notice: Subject to any disclaimer, the term of this patent is extended or adjusted under 35 U.S.C. 154(b) by 0 days. days.

(21) Appl. No.: 15/248,285

(22) Filed: Aug. 26, 2016

(65) Prior Publication Data

US 2017/0253175 A1     Sep. 7, 2017

(30) Foreign Application Priority Data

Mar. 1, 2016  (CN) ..................... 2016 2 0154058 U

(51) Int. Cl.
| | |
|---|---|
| *B62J 3/00* | (2006.01) |
| *B60Q 1/26* | (2006.01) |
| *B60Q 1/34* | (2006.01) |
| *B60Q 1/44* | (2006.01) |
| *B62J 6/00* | (2006.01) |

(52) U.S. Cl.
CPC ............. *B60Q 1/2676* (2013.01); *B60Q 1/34* (2013.01); *B60Q 1/44* (2013.01); *B62J 6/005* (2013.01); *B60Q 2900/30* (2013.01); *B62J 2006/006* (2013.01); *B62J 2300/008* (2013.01)

(58) Field of Classification Search
CPC .......... B60Q 1/2676; B60Q 1/34; B60Q 1/44; B60Q 2900/30; B62J 6/005; B62J 2006/006; B62J 2300/008
USPC ............ 340/432, 475, 463, 468, 539.1, 457; 362/105, 106
See application file for complete search history.

(56) References Cited

U.S. PATENT DOCUMENTS

| | | | | |
|---|---|---|---|---|
| 6,982,633 | B2* | 1/2006 | Burdick | B60Q 1/2676 340/332 |
| 7,667,586 | B2* | 2/2010 | Cheng | B60Q 1/2676 180/167 |
| 2011/0037580 | A1* | 2/2011 | Lin | B60Q 1/302 340/432 |
| 2011/0057781 | A1* | 3/2011 | Lee | A42B 3/0453 340/432 |
| 2013/0128046 | A1* | 5/2013 | Gindin | G07C 5/0891 348/148 |
| 2013/0307678 | A1* | 11/2013 | Ransom | B62J 6/005 340/432 |
| 2014/0118129 | A1* | 5/2014 | Hutchens | B62J 6/003 340/432 |
| 2014/0210609 | A1* | 7/2014 | Yang | B60Q 1/2676 340/463 |
| 2015/0106996 | A1* | 4/2015 | Lau | B60Q 1/2673 2/160 |

* cited by examiner

*Primary Examiner* — Anh V La
(74) *Attorney, Agent, or Firm* — Kwan & Olynick LLP

(57) ABSTRACT

The utility model relates to a riding helmet with automatic brake detection and steering indication functions, which consists of the helmet body and the left steering lamp and right steering lamp installed on its front and rear sides, wherein, the two lamps are electrically connected with the control module, the control module is designed with a wireless receiving module that is linked up with the wireless receiving module mounted on the bicycle, the wireless remote control module is also electrically connected with brake detection device and manual control device, and the steering lamps can work according to the signals of the brake detection device and manual control device.

1 Claim, 4 Drawing Sheets

RIDING HELMET WITH AUTOMATIC BRAKE DETECTION AND STEERING INDICATION FUNCTIONS

CROSS REFERENCE TO RELATED APPLICATION

This application takes priority from and claims the benefit of Chinese Patent Application Serial No. 201620154058.6 filed on Mar. 1, 2016 the contents of which are herein incorporated by reference.

TECHNICAL FIELD

The utility model relates to a protective article, or, specifically, a riding helmet with automatic brake detection and steering indication functions.

BACKGROUND OF UTILITY MODEL

In the context of advocating energy conservation and environmental protection nowadays, more and more people are selecting bicycle riding as a means of travel or as a way of physical exercise. However, riding can pose certain potential safety hazards when no adequate protective articles are provided. Helmet is hence one of the common protective articles for the rider, which can protect the head of the rider from external injuries. The shell of the helmet is usually made of high-strength materials like metals, engineering plastics, aramid fiber and so forth, through the deformation of which a majority of the impact force would be absorbed, so as to alleviate the injuries to the head and protect the safety and health of the rider. The problem is that, these helmets only provide passive protection, that is, provide protection only after the occurrence of a safety accident. It means that they can provide no prevention against safety accidents in advance; particularly, during the night or on a dark road, given that the bicycles are lighter and mostly do not have a head lamp or steering lamp, it makes it very difficult for others on the road to perceive the position or steering intention of the rider. As a result, damages may be caused by motor vehicles to the rider.

SUMMARY OF UTILITY MODEL

The utility model aims to overcome the defects of existing technologies, and to provide a riding helmet with automatic brake detection and steering indication functions that is characterized by simple structure, convenient use and low production cost and can effectively improve the safety performance of the helmet.

The aim of the utility model is to be realized through the following approach: a riding helmet with automatic brake detection and steering indication functions, which consists of the helmet body and the left steering lamp and right steering lamp installed on its front and rear sides, wherein, the said two lamps are electrically connected with the control module, the said control module is designed with a wireless receiving module that is linked up with the wireless receiving module mounted on the bicycle, the said wireless remote control module is also electrically connected with brake detection device and manual control device, and the steering lamps can work according to the signals of the brake detection device and manual control device.

The said brake detection control device is a position switch set on the brake handle, so that the rider, through operating the brake handle, can connect or disconnect the position switch to send control signals.

The said manual control device is a control button set on the handlebar.

The said helmet body is also designed with a braking indicator in the rear middle position.

The said wireless receiving module on the helmet body and the said wireless receiving module on the bicycle adopt 2.4G remote control modules.

The said left steering lamp and right steering lamp adopt LED lamp panels.

The said braking indicator adopts an LED lamp panel.

The said control module is also electrically connected with a gyroscope, which can be used to control the service of steering lamps through sensing the turning of head by the rider.

The utility model has the following beneficial effects: 1 It is characterized by simple structure, convenient assembly, low production cost and enhanced market competitiveness. 2 The helmet is designed with steering lamps which can be used by the rider to remind the vehicles behind in the steering process, which thus improves the riding safety. 3 Relying on the different working modes of the steering lamps, steering and braking indications can be provided, thus to not only meet relevant service requirements but also to reduce the complexity of the system and make convenience for marketing purpose. 4 The control system is connected with the brake detection device and the manual control device via wireless technologies, thus avoiding the interference with riding process by the power line connection, making further convenience for the rider and protecting the rider in the riding process.

BRIEF DESCRIPTION OF THE DRAWINGS

Drawing 1 is the structural space diagram of the utility model.

Drawing 2 is the structural rear view of the utility model.

Figure 1:
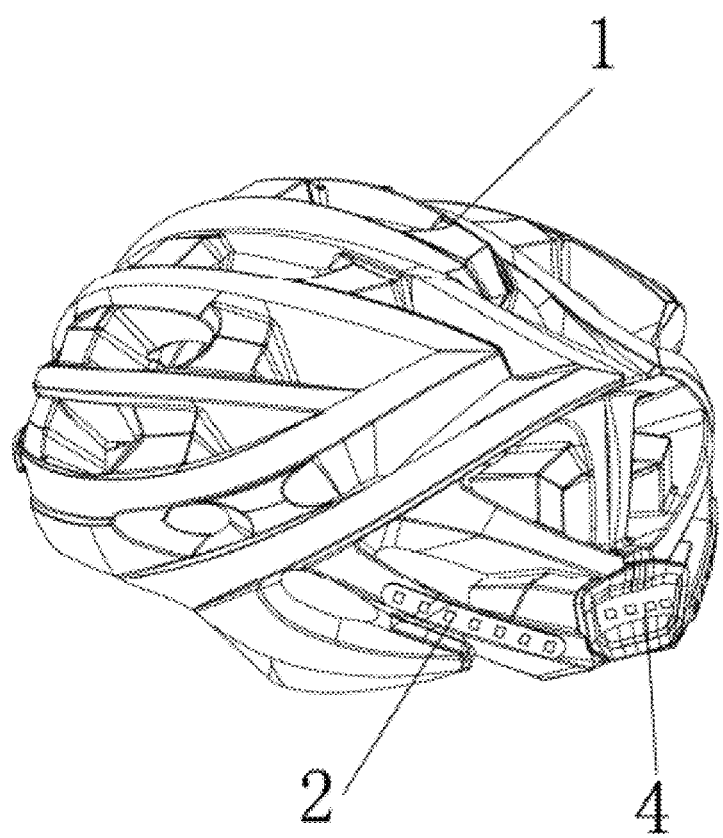

Drawing 3 is the structural front view of the utility model.

Drawing 4 is the electrical appliance diagram of the utility model.

DETAILED DESCRIPTION OF THE PREFERRED EMBODIMENT

Further specific explanations of the utility model are provided below in combination with the appended drawings. The utility model relates to a riding helmet with automatic brake detection and steering indication functions, which consists of the helmet body 1 and the left steering lamp 2 and right steering lamp 3 installed on its front and rear sides, wherein, the said two lamps are electrically connected with the control module, the said control module is designed with a wireless receiving module that is linked up with the wireless receiving module mounted on the bicycle, the said wireless remote control module is also electrically connected with brake detection device and manual control device, and the steering lamps can work according to the signals of the brake detection device and manual control device.

The said brake detection control device is a position switch set on the brake handle, so that the rider, through operating the brake handle, can connect or disconnect the position switch to send control signals.

The said manual control device is a control button set on the handlebar.

The said helmet body 1 is also designed with a braking indicator 4 in the rear middle position.

The said wireless receiving module on the helmet body and the said wireless receiving module on the bicycle adopt 2.4G remote control modules.

The said left steering lamp 2 and right steering lamp 3 adopt LED lamp panels.

The said braking indicator 4 adopts an LED lamp panel.

The said control module is also electrically connected with a gyroscope, which can be used to control the service of steering lamps through sensing the turning of head by the rider.

Figure 2:
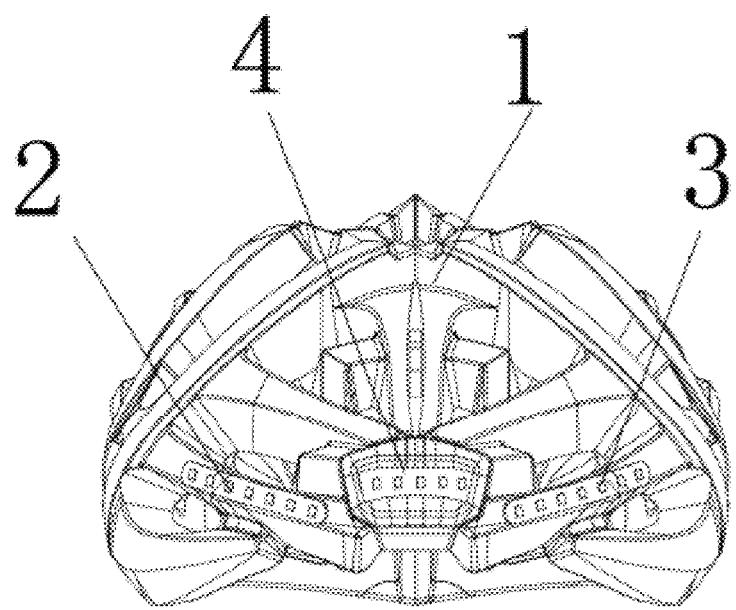
Figure 3:
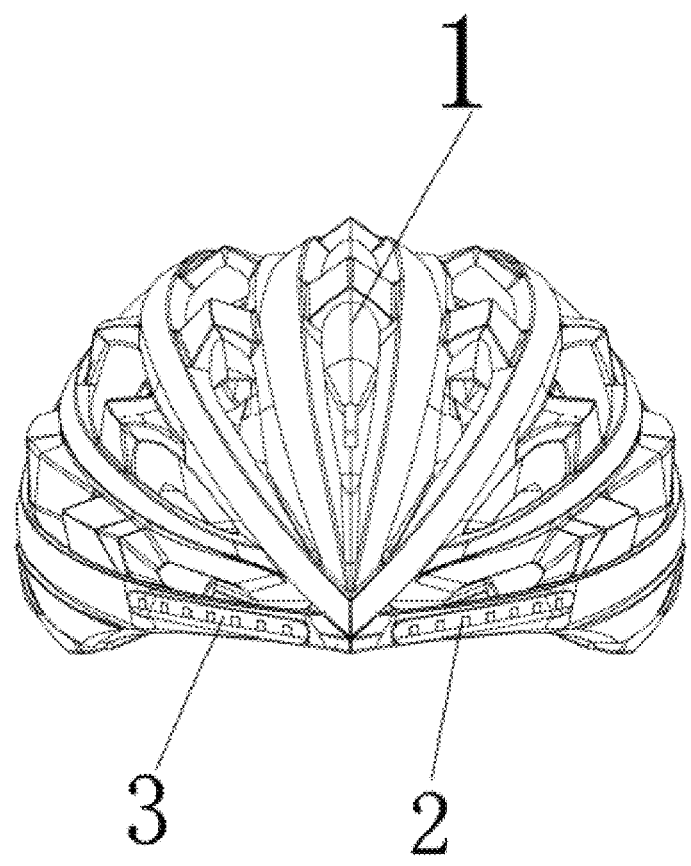
Figure 4:
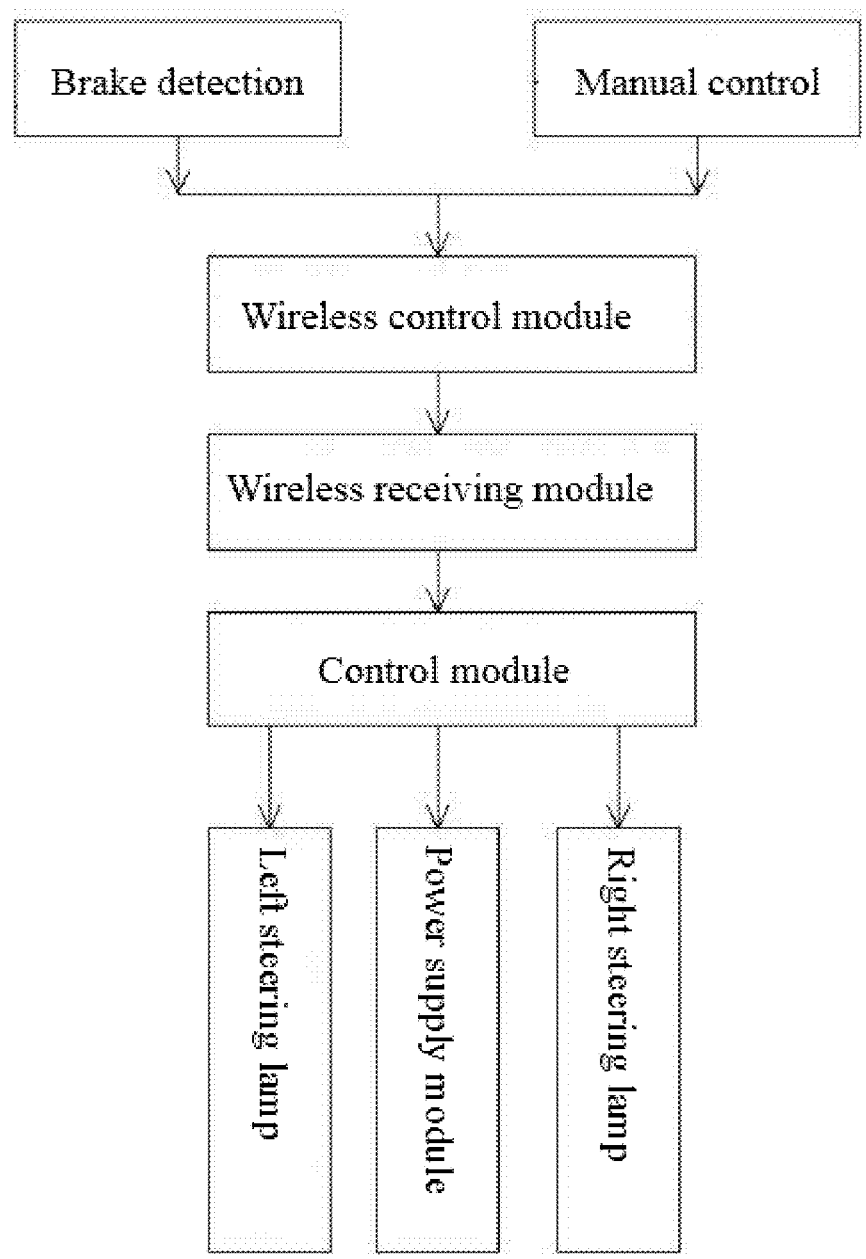

Working principle: In the actual working process, when the rider brakes, the brake handle is driven to move and to connect the position switch on it, thus producing electric signals in the system. The electric signals then send the control signals via the wireless remote control module. After receiving the signals, the wireless receiving module set on the helmet turns on the left and right steering lamps simultaneously, thus to remind the vehicles both in front of and behind the bicycle. In addition to using the steering lamps simultaneously to send the braking signals, the rider can also set an individual braking indicator on the helmet body (as shown in FIG. 2), so that the indicator would light on when the rider brakes.

When the rider wants to steer, he/she can manually control the manual controller on the fork spanner. When the rider wants to steer towards the right, he/she can operate the control switch and send the control signals in the form of wireless signals; when the control system receives the signals, the right steering lamp is activated in the form of flashing, thus to remind the vehicles both in front of and behind the bicycle of the rider's intention of steering towards the right and to enhance riding safety.

Further, to improve the use convenience of the device, a gyroscope can be set inside the helmet and electrically connected with the control system, and the control system can be written inside with a corresponding control code. When the rider turns his/her head towards a certain direction consecutively twice within a certain period of time, the steering lamp in this direction is turned on; when the rider looks up or down consecutively twice or more within a certain period of time, the braking lamp is turned on. The specific modes can be set by the manufacturer according to the actual conditions, and are not limited here.

Displayed and described above are the basic principle, main characteristics and advantages of the utility model. It should not be difficult for technicians in the industry to understand that the utility model is not limited by the above example, that what is described in the above example and manual is only the principle of the utility model, and that, under the premise of not breaking away from the spirit or scope of the utility model, the utility model may have various variations and improvements (like the working mode of steering lamps, the type and shape of lamps, etc.), all of which shall fall within the scope of the utility model to be protected.

What is claimed is:

1. A helmet comprising:
   helmet body;
   left steering lamps and right steering lamps installed on front and rear sides of the helmet body, the steering lamps being wirelessly coupled to a brake detection control device on a brake handle of a bicycle, wherein the left steering lamps and right steering lamps include LED lamp panels;
   a manual control device including a control button set on a handlebar of the bicycle;
   a first wireless receiving module on the helmet body wirelessly coupled to a second wireless receiving module on the bicycle, the wireless receiving modules including 2.4G remote control module connections;
   a brake light in the rear middle position of the helmet, the brake light is wirelessly coupled to the brake detection control device on the brake handle of the bicycle, wherein the brake detection control device is a position switch set on the brake handle such that a rider can connect or disconnect the position switch to send control signals to the steering lamps through operating the brake handle, wherein the brake light includes an LED lamp panel, wherein the brake control device is configured such that connection of the position switch causes electric signals to be produced and further causes control signals to be sent wirelessly via the second wireless receiving module on the bicycle to the first wireless receiving module on the helmet in order to turn on both the brake light and the left and right steering lamps during braking; and
   a control module electrically coupled the left and right steering lamps and to a gyroscope, the control module being connected wirelessly to the manual control device and the brake detection control device via the wireless receiving module, the control module configured to automatically sense a left or right turn and turn on the corresponding steering lamps thereby producing a turn signal, wherein the control module can be used to control the operation of steering lamps through sensing the turning of the head by the rider wearing the helmet, wherein sensing is accomplished via a control code written into the control module, the control code being written such that when the rider turns his/her head towards a certain direction consecutively twice within a certain period of time, the steering lamp in the certain direction is turned on, wherein the control code is also written such that when the rider looks up or down consecutively twice or more within a certain period of time, the brake light is turned on.

* * * * *